(No Model.) 2 Sheets—Sheet 1.

J. A. & B. A. JEFFERY.
ELECTRIC DENTAL ENGINE.

No. 530,344. Patented Dec. 4, 1894.

Witnesses,

Inventors,
Joseph A. Jeffery
Benjamin A. Jeffery
By Dewey & Co.
Attys (No Model.) 2 Sheets—Sheet 2.

J. A. & B. A. JEFFERY.
ELECTRIC DENTAL ENGINE.

No. 530,344. Patented Dec. 4, 1894.

Witnesses,

Inventors,
Joseph A. Jeffery
Benjamin A. Jeffery
By Dewey & Co.
Attys

UNITED STATES PATENT OFFICE.

JOSEPH A. JEFFERY AND BENJAMIN A. JEFFERY, OF SAN FRANCISCO, CALIFORNIA.

ELECTRIC DENTAL ENGINE.

SPECIFICATION forming part of Letters Patent No. 530,344, dated December 4, 1894.

Application filed April 5, 1894. Serial No. 506,465. (No model.)

*To all whom it may concern:*

Be it known that we, JOSEPH A. JEFFERY and BENJAMIN A. JEFFERY, citizens of the United States, residing in the city and county of San Francisco, State of California, have invented an Improvement in Dental Electric Engines; and we hereby declare the following to be a full, clear, and exact description of the same.

Our invention relates to a dental electric engine.

It consists in certain details of construction which will be more fully explained by reference to the accompanying drawings, in which—

Figure 1:
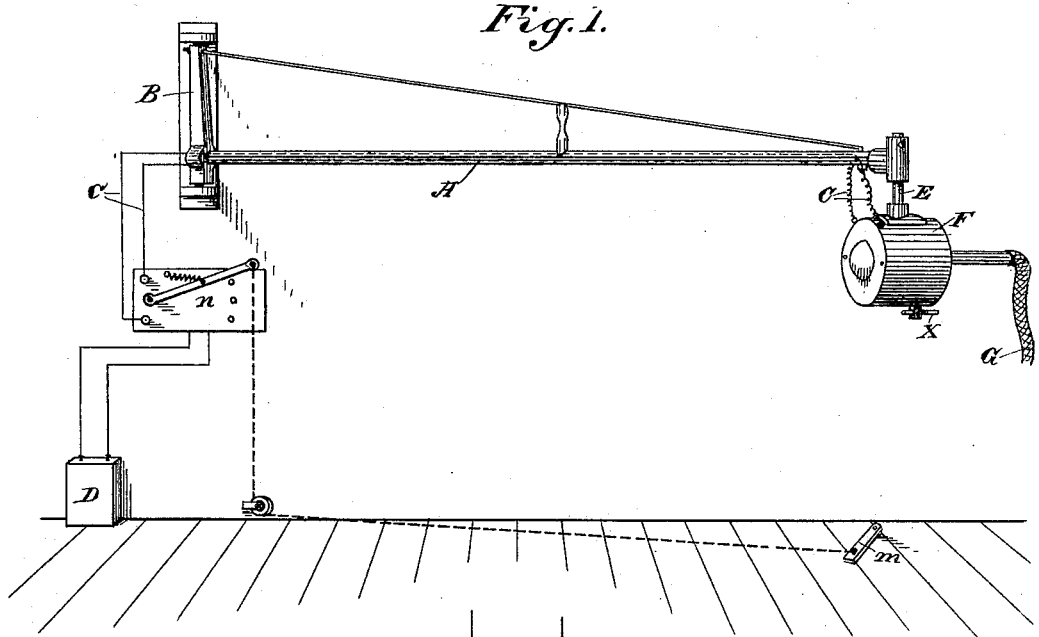
Figure 2:
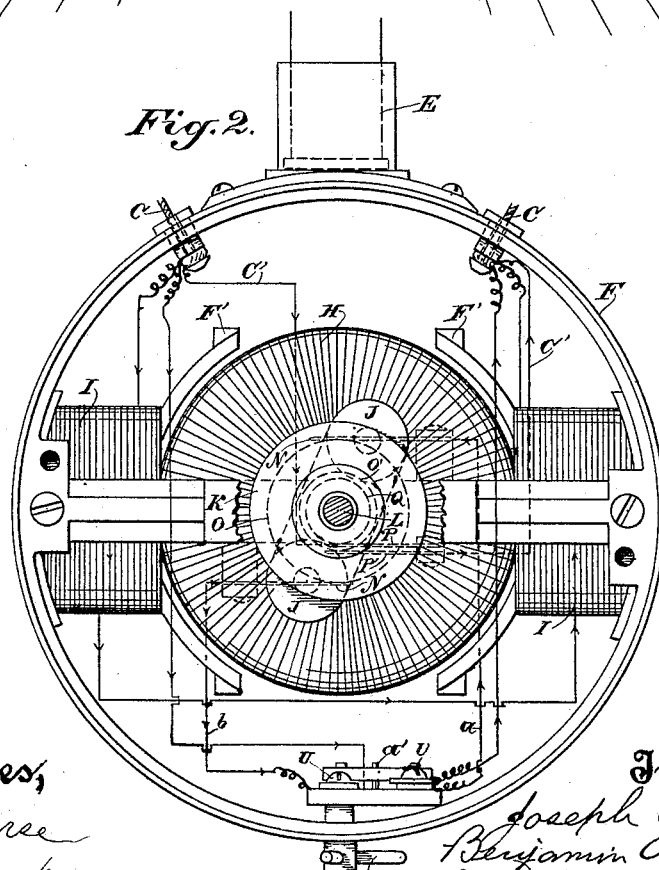
Figure 3:
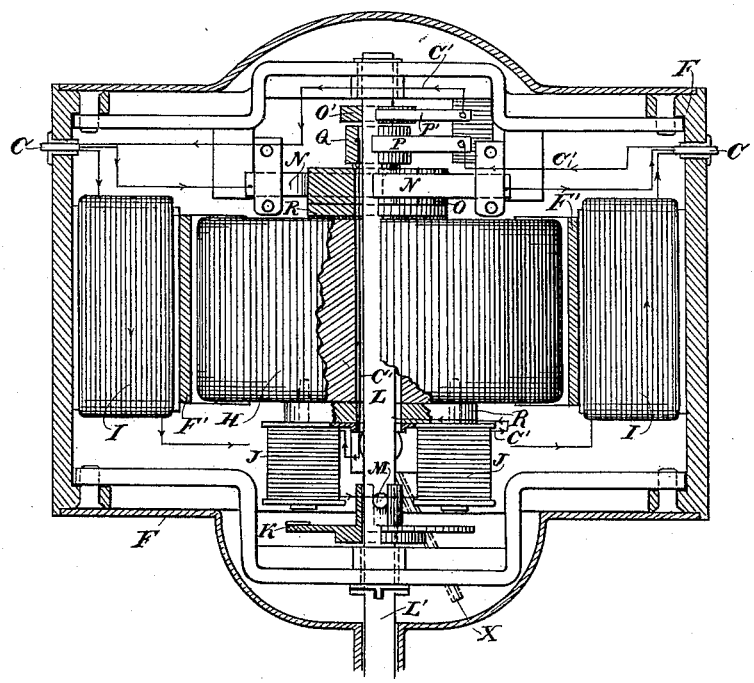
Figure 4:
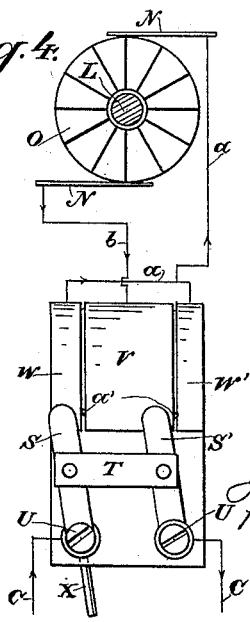

Figure 1 is a side elevation showing the apparatus. Fig. 2 is an end view of the casing containing the motor, the cover being taken off. Fig. 3 is a horizontal section through the case taken in the plane of the longitudinal axis of the motor. Fig. 4 is an enlarged view of the switch mechanism for reversing.

The object of our invention is to provide an improved means for supporting and adjusting the motor so that it may be turned to any desired position for application of the power, and to reduce the noise and vibration caused by its rapid rotation, to provide an improved means for reversing the motor and for connecting and disconnecting the drive shaft, and certain other improvements which will more fully appear from the following specification.

A is a bracket which is suitably hinged to the wall as shown at B so as to be capable of movement in a horizontal plane around its fulcrum point. This bracket may be hollow and the wires C from the battery D or other source of power pass through the hollow bracket arm. By means of a foot lever $m$, and a switch $n$, the battery is connected or disconnected to start or stop the motor and to regulate its speed. At the end of this bracket is a suspension rod E, to the lower end of which the motor case and field magnet F are connected, so that they may be swiveled around this connection to stand in any desired position with relation thereto. The exterior cylindrical shell F, forming the yoke, the segmental poles F' and the intermediate cores of the field magnet within which the motor armature rotates, are cast integral and form a single structure.

From the end of the motor case or shell extends the driving shaft of the dental instrument, these shafts being usually flexible, as shown in the drawings at G.

Within the shell F is the rotary armature H.

I are the cores and F' the poles of the fields between which the motor armature rotates.

The shell F is closed and practically hermetically sealed so that the whole interior mechanism is protected from any exposure to dust or outside influence. These motor armatures, when set in motion, will run for a considerable time after the current has been cut off, on account of their weight and momentum, but it is desirable to stop the dental implement instantaneously. For this purpose we have shown a clutch mechanism which consists of an electro magnet J fixed to rotate with the motor armature, and an armature which consists of a disk K turning with and slidable upon the shaft L upon which the motor armature is mounted so as to normally turn without driving the motor shaft. The same mechanism which completes the circuit for driving the motor armature also completes the circuit for energizing the magnet J, and when this is completed, the clutch armature K will be drawn into contact with the poles of the magnet, and will thus be caused to rotate and with it the shaft which extends into the hand piece of the dental instrument. Whenever the current is cut off the motor and clutch magnet are instantly and simultaneously de-energized, and although the motor armature will continue to run for some time on account of its weight and momentum, the clutch armature and the shaft connected with it will stop instantly.

The clutch armature is slidable upon the shaft L moving upon a pin or feather M, and it is disengaged from the magnet when the latter is de-energized. In most cases, the attraction of the magnet will form sufficient frictional contact between its poles and the armature disk K, to furnish all the power necessary to drive the motor shaft L and cable G of the hand piece, but if it be found necessary to increase this power, or to prevent slippage, the disk may have a lug or projection formed upon it in such a position that it will engage one of the projecting poles of the magnet, and the driving will thus be positive without any chance of slippage.

The wires from the battery enter the motor case or shell as shown, and the current passes to the motor through brushes N (Figs. 3 and 4) which form contact with the commutator sections O. The same current acts to energize the magnet J and is conveyed to it by means of a brush P with which one battery wire C' is connected, and which presses upon a collar Q, insulated from the shaft L and connected with the electro-magnet J, while the other wire from the magnet is grounded by being connected with the shaft L through a brush P' and a collar O' fixed upon the shaft L. The motor-armature, electro magnet, commutator O, and collar Q, are fixed upon a sleeve R R which turns loosely upon the shaft L, the collar Q being insulated from the sleeve and shaft as previously stated, and connected with the magnet J by a wire leading along the sleeve from the collar Q to the magnet, and thus the current is simultaneously applied to energize the magnet J, and make connection between the motor armature and the driving shaft upon which the motor armature loosely turns, and also to communicate power to start the motor armature. The magnet is de-energized and the current cut off from the motor simultaneously in the same manner.

For convenience in removing the end of the case through which the driving shaft passes, we have shown this shaft made in two parts L and L', one of which has a wedge shaped feather projecting from it, and the other a groove or channel made in it which is adapted to engage the projecting edge when the case is put together so that the shaft is united to run as one piece, but which is disengaged when the end of the case is removed.

Power is communicated to the motor and magnet as before stated, through the wires C from the battery D.

Inclosed in the motor shell is a reversing switch which consists of the lever plates S S' connected so as to move together by a transverse insulated bar T, and the plates are fulcrumed to turn about the binding posts U to which the positive and negative wires from the battery are connected. The switch consists of a central plate V and two side plates W W' insulated from the central plate. The switch levers S S' are moved by means of a lever arm X which projects from an extension of one of the binding posts U passing out through the side of the case as shown in Fig. 2. The side plates W W' of the switch are connected together by wire shown at a (Fig. 4) and a branch from this wire connects with one of the brushes N. The central plate V is connected with the other brush by a wire b. When the switch is turned, as in Fig. 4, so that one of the levers S rests upon the part W of the switch, and the other lever S' upon the part V, the current will pass through the switch and through the motor armature as shown by the arrows in Fig. 4. By turning the switch so as to reverse its position with the lever S' resting upon the part W', and the lever S upon the part V, the current will pass through the brushes, commutator and motor armature in the opposite direction and reverse the direction of rotation of the motor armature.

To prevent a possible short circuit in reversing the switch, two insulated projections a' are placed between the plates W, V and W' which raise the plates S S' a little when they pass over them in changing their position to reverse the motor.

Having thus described our invention, what we claim as new, and desire to secure by Letters Patent, is—

1. In a dental electric engine, consisting of a motor and a swiveled bracket support therefor, a case or shell swiveled upon the outer end of the bracket within which the motor armature rotates, a two part shaft, upon one part of which the motor armature rotates within the case while the other is journaled in a sleeve extending outwardly in line with the axis of the motor armature, and a clutch connection between the two parts of the shaft whereby they may be separated when the end of the case is removed.

2. A dental electric engine consisting of a case, a central shaft journaled within the case, an armature loosely revoluble upon the shaft between the poles of the field magnet formed within the casing, an electro magnet fixed to and turnable with the motor armature, a disk armature revoluble with and movable longitudinally upon a feather on the shaft of the motor, and adapted to connect the motor armature with the shaft when the electro magnet is energized to attract the clutch armature to itself.

3. A dental electric engine, consisting of a motor armature revoluble within its fields, an outer inclosing case forming a part thereof, a magnet fixed to and revoluble with the motor armature upon a shaft which is journaled within the casing, a disk armature revoluble with the shaft and slidable longitudinally thereon so as to be attracted and held by the poles of the magnet when the latter is energized, and an electric circuit adapted to energize the motor armature and the electro magnet simultaneously.

4. A dental electric engine consisting of a motor armature revoluble between its fields within an hermetically closed casing forming a part thereof, a revoluble shaft journaled within the casing and upon which shaft the motor armature is loosely revoluble, an electro magnet fixed to and revoluble with the motor armature, and a disk armature revoluble with the shaft and slidable longitudinally thereon so as to be drawn into contact with the poles of the magnet when the latter is energized, a commutator and brushes through which the electric circuit passes to the motor armature, a collar turning with the motor armature and commutator, having a brush forming contact with its surface, through which connection is made with the source of electrical supply, a wire leading from it through the motor armature to the electro magnet, and a connection between the other terminal of the magnet and the shaft to form a ground therefor.

5. A dental electric engine consisting of a motor armature revoluble between its fields within a closed casing, a central shaft journaled within the casing upon which the motor armature revolves loosely, a disengaging clutch between the shaft and the motor armature consisting of an electro magnet revoluble around the shaft with the motor armature, and an armature revoluble with the shaft independent of the motor armature and slidable upon the shaft to engage with or disengage from the poles of the electro magnet when the latter is energized or de-energized, whereby the shaft and motor armature are connected or disconnected, and a switch mechanism whereby the rotation of the motor armature is reversible.

6. The reversing switch consisting of the switch levers connected respectively with the positive and negative poles of a source of electrical supply, insulated plates connected with opposite brushes of the motor, and over which the switch plates are movable to reverse the rotation of the motor, and insulated projections between the plates to prevent short circuiting when the levers are moved over them in reversing the motor.

In witness whereof we have hereunto set our hands.

JOSEPH A. JEFFERY.
BENJ. A. JEFFERY.

Witnesses:
S. H. NOURSE,
J. A. BAYLESS.